March 18, 1930.   W. HUELLER   1,751,206
INDICATOR FOR MOTOR VEHICLES
Filed Feb. 12, 1929   3 Sheets-Sheet 1

INVENTOR
Walter Hueller
BY C. P. Zoepel
his ATTORNEY

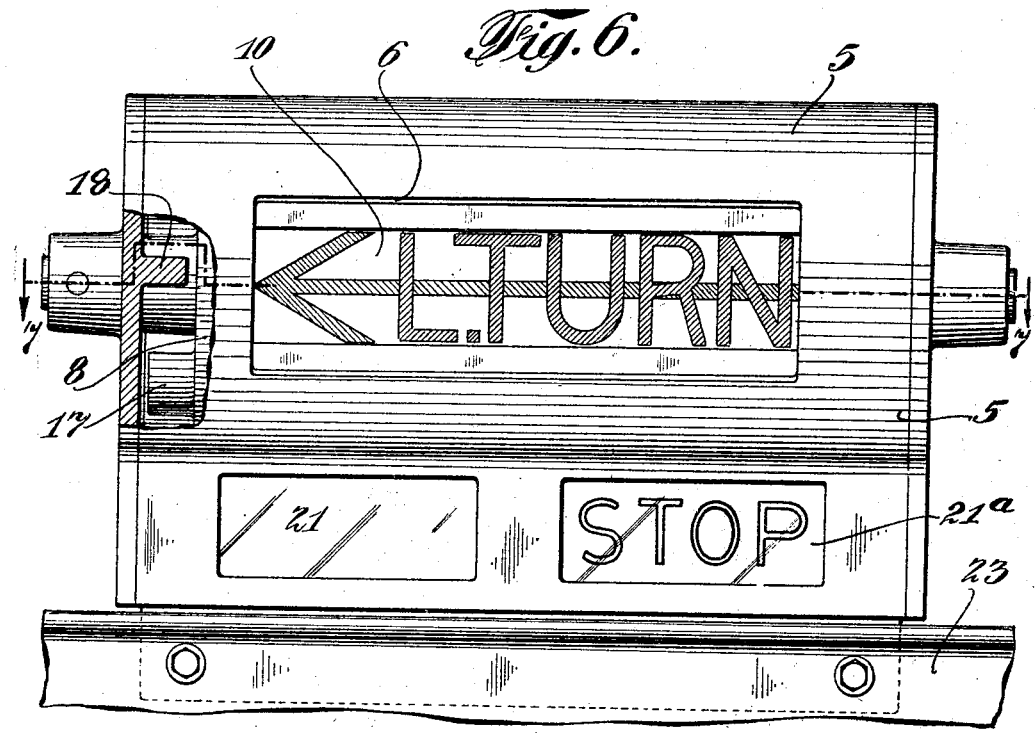
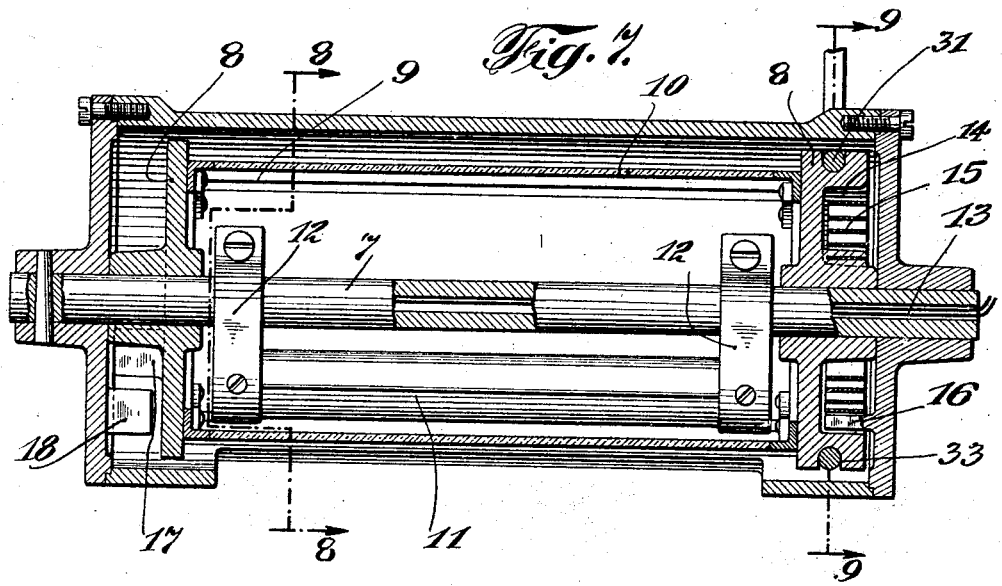

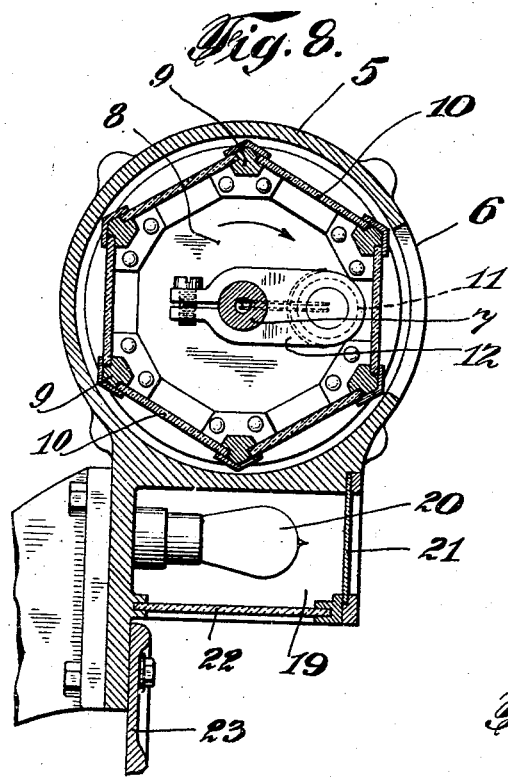
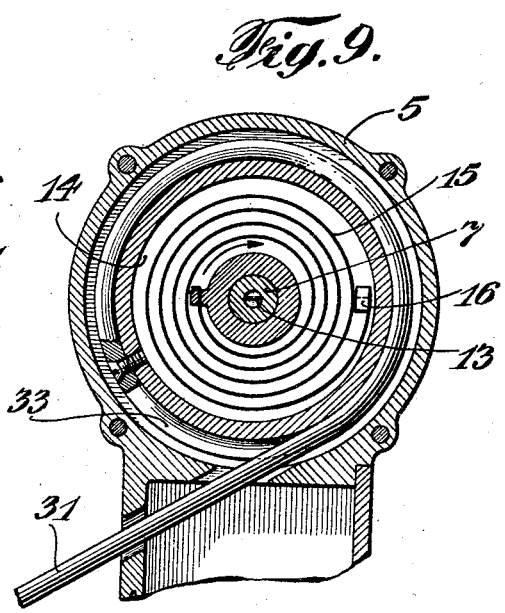
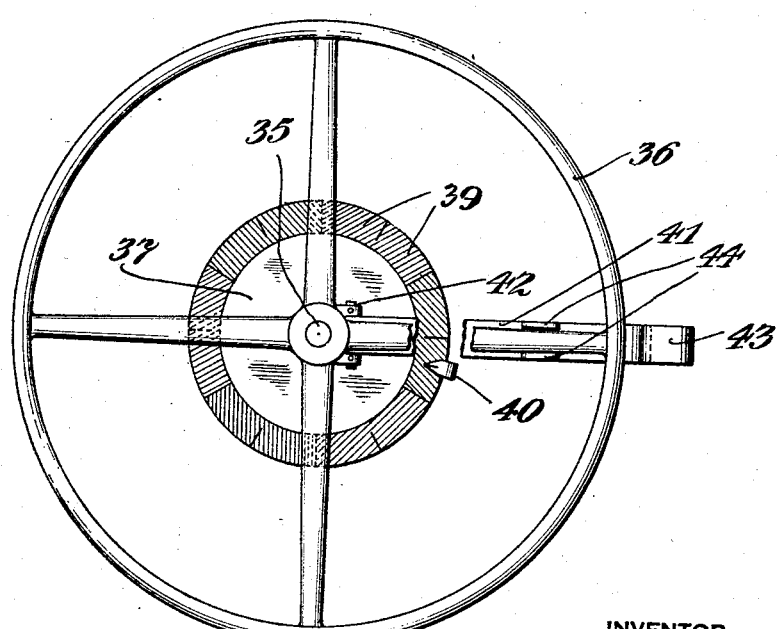

Patented Mar. 18, 1930

1,751,206

UNITED STATES PATENT OFFICE

WALTER HUELLER, OF WEST NEW YORK, NEW JERSEY

INDICATOR FOR MOTOR VEHICLES

Application filed February 12, 1929. Serial No. 339,339.

This invention relates to indicators for motor vehicles, and has for its primary object and purpose to provide a simply constructed and efficiently operating device which may be easily and quickly operated by the motorist to indicate to other motorists or pedestrians, his intentions as to the control and operation of the vehicle.

It is a more particular object of the invention to provide a device for the above purpose embodying the movable legend carrying member suitably mounted upon the body of the vehicle and operating means therefor automatically actuated by the operation of the steering wheel to move said member to a position indicating either a right or left hand turn.

It is also a more particular object of the invention to provide as a part of said operating means for the movable indicating member, a lever having releasable engagement with the steering wheel and whereby said operating means may be independently actuated to move said member and display other legends carried thereby.

With the above and other objects in view, the invention consists in the improved indicating device for motor vehicles, and in the form, construction and relative arrangement of its several parts as will be hereinafter more fully described, illustrated in the accompanying drawings, and subsequently incorporated in the subjoined claims.

In the drawings, wherein I have illustrated one simple and practical embodiment of the invention, and in which similar reference characters designate corresponding parts throughout the several views,—

Fig. 6 is a side elevation of one of the indicating devices, the housing thereof being partly shown in section;

Fig. 7 is a longitudinal horizontal sectional view taken on the line 7—7 of Fig. 6;

Fig. 8 is a transverse section taken on the line 8—8 of Fig. 7;

Fig. 9 is a similar sectional view taken on the line 9—9 of Fig. 7, and

Fig. 10 is a plan view of the steering wheel and the parts of the indicator operating means directly associated therewith.

Figure 1:
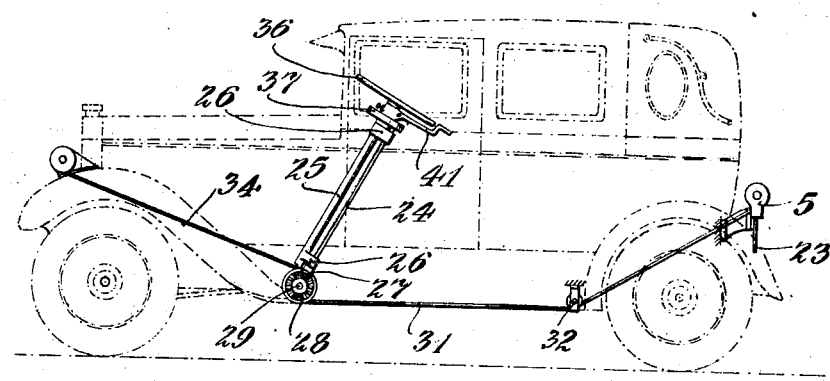
Figure 1 is a side elevation showing a motor vehicle in dotted lines as equipped with my improved indicating device.
Figure 2:
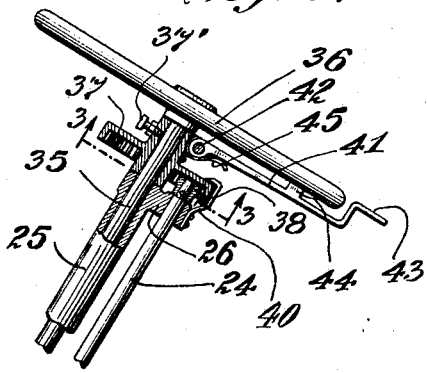
Fig. 2 is a detail sectional view of a part of the operating means for the indicator and showing the actuating lever therefor operatively connected with the steering wheel.
Figure 3:
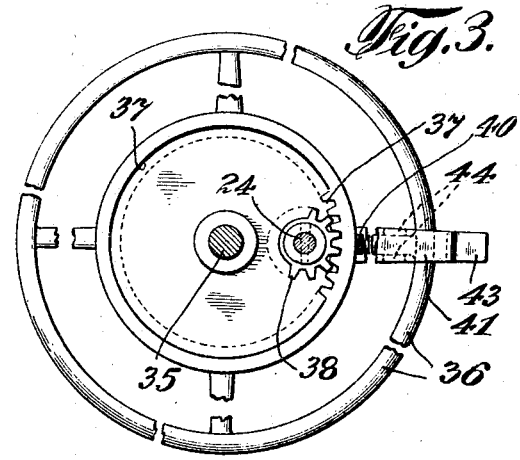
Fig. 3 is a horizontal sectional view on an enlarged scale taken on the line 3—3 of Fig. 2.
Figure 4:
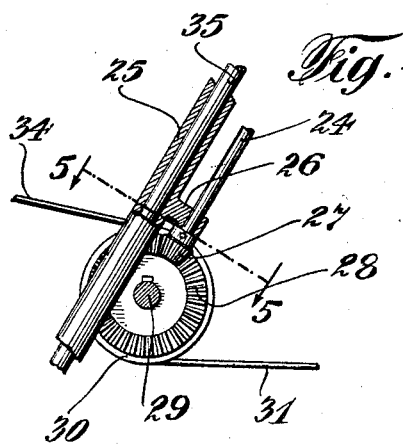
Fig. 4 is a detail section illustrating other parts of the operating means for the direction indicator.
Figure 5:
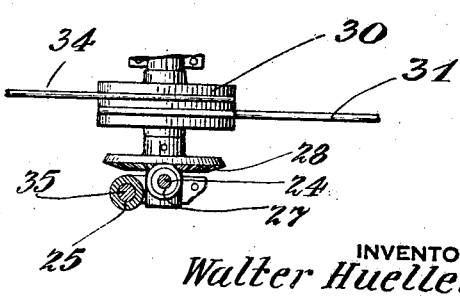
Fig. 5 is a horizontal sectional view taken on the line 5—5 of Fig. 4.

Referring for the present more particularly to Figs. 6 to 9 inclusive of the drawings, each indicating device, one of which may be mounted either only at the rear end of the vehicle, or at the front end as well, includes a suitably formed housing indicated at 5. In the present instance, this housing is shown as of a general cylindrical shape and at one side thereof, the body wall of the housing is provided with a longitudinally extending opening 6 therein. Within this housing, a rotatable indicating member is supported upon a hollow shaft shown at 7 extending axially through said housing and suitably mounted in the opposite end walls thereof. The indicating member includes the spaced heads 8 directly journalled on the shaft 7 and connected with each other at spaced points and adjacent their peripheries by the bars 9. Upon these bars the opposite longitudinal edges of translucent glass plates 10 are supported and rigidly secured in any suitable manner. The bars 9 and the plates 10 in the illustrated embodiment of the device are of such number and so arranged as to provide a drum or elongated cylinder of octagonal form in cross section. Each of these translucent plates 10 bears a suitable indicative word or legend, which in certain cases may be associated with a symbol. The plates 10 may be white while the areas of said plates defining the letters and symbols may be suitably colored, or on the other hand, the letters and symbols may remain white while the other parts of the glass plate are colored.

Within the drum formed by the translucent plates 10, an elongated electric lamp bulb 11 is arranged and suitably mounted in spaced brackets 12 fixed on the shaft 7. The current supply wires for this lamp indicated at 13 are extended through the hollow shaft 7. One of the heads 8 is formed with a recess 14 in one side thereof to receive the spiral spring 15, one end of which is suitably fixed to the head 8 while the other end thereof is attached to the lug or projection 16 projecting inwardly from the end wall of the housing 5. This spring 15 acts to yieldingly hold the rotatable indicator drum against rotation in a normal position with a lug 17 on the opposite end head thereof in contact with the stop lug 18 on the inner face of the adjacent end wall of the housing 5.

The housing 5 to be mounted upon the rear end of the motor vehicle may be provided at its lower side with compartments, one of which is indicated at 19. Each compartment contains a lamp 20, one of these lamps constituting a tail light and the rear side of the compartment being closed by the translucent colored glass plate 21. The other compartment houses the stop light which is operated from the vehicle brake pedal in the usual way and the rear side of said compartment is closed by the colored glass plate 21$^a$ having the word "Stop" thereon. The lower side of the compartment 19 housing the stop light consists of an uncolored glass plate 22 through which the light rays from the lamp may pass to illuminate the license plate indicated at 13.

The operating means for the rotatable indicator member includes a shaft 24 mounted closely adjacent to the steering post 25 in parallel relation therewith and journalled at its upper and lower ends in suitable bearings 26 on said post.

To the lower end of this shaft 24 a beveled pinion 27 is fixed and meshes with a beveled gear 28 on one end of the transversely positioned shaft 29. A double grooved pulley 30 is also fixed on the latter shaft. A flexible cord or cable 31 has one of its ends engaged in one groove of the pulley 30 and fixed thereto, said cable being trained around a suitably placed guide sheave 32 and extending into the indicator housing 5 at the rear end of the motor vehicle where the other end of said cable is engaged in a peripheral groove 33 formed on one of the drum heads 8 and securely fixed at its extremity to said head.

A similar flexible cable 34 may be engaged in the other groove of the pulley 30 and extended forwardly therefrom and connected with the rotatable indicating member mounted upon the forward end of the motor vehicle as shown in Fig. 1 of the drawings.

The steering shaft 35 extends above the upper end of the post 25 and has the usual steering wheel 36 fixed thereto. Between said wheel and the upper end of the post 25 a suitably formed internal gear 37 is loosely mounted for rotation on the steering shaft 35. The upper end of the shaft 24 has a pinion 38 fixed thereon and in constant mesh with the teeth of the gear 37. The upper surface of the gear 37 has its marginal portion provided with circumferentially extending contrastingly colored sections or areas indicated at 39 and over this marginal surface of the gear 37, the upper end of a suitable index finger 40 fixed to the shaft bearing 36 projects. It will be understood that there are the same number of these surface sections 39, as the number of drum panels or plates 10, the colors of said surface sections corresponding to the different colors on the translucent plates 10 of the rotatable indicating member.

To the bearing hub extension of the gear 37 one end of a lever 41 is pivotally connected as at 42. This lever extends radially beneath the steering wheel and beyond the perimeter thereof has its other end upwardly offset and provided with a suitable finger piece 43. Adjacent to the latter end of the lever and within the rim of the steering wheel, said lever is provided with spaced upstanding fingers 44 which are adapted to normally engage the opposite edges of one of the radial arms of the steering wheel. The lever 41 is yieldingly held in this position by means of a suitable leaf spring 45 bearing against the under side of said lever adjacent to its pivoted end 42.

In one practical form of the invention, the indicator plates 10 may be provided for instance, with such indicative words or legends as "Go", "L. Turn", "R. Turn", "Slow Down", "Pass" and "Back Up". Assuming that in a line of traffic the car equipped with the indicator is preceded and followed by other cars and the operator thereof desires to turn either to the right or left around the preceding car, such intention will be automatically indicated by the turning of the steering wheel in the proper direction. Thus, since the lever 40 is held in connection with the steering wheel by the fingers 44, said lever will also be moved, thereby transmitting rotation to gear 37 and rotating shaft 24.

The gear ratios transmitting movement to the cable 31 are such that there will be sufficient rotation of the indicator drum to display the plates 10 bearing the indications "L. Turn" or "R. Turn" as the case may be, within the opening 6 of the housing.

A set screw 37' is carried by the hub extension of the gear member 37 and is adapted to be adjusted and locked in position in frictional bearing engagement with the steering shaft 35 so that there will be sufficient frictional resistance to retain the operating means for the indicator drum in adjusted position when it is operated by the lever 41 independently of the steering wheel, against the action of the spring 15. This frictional resistance is not however, sufficiently great to prevent the independent turning movement of the steering shaft 35.

If the motorist desires to proceed into an intersecting street or highway, thereby making a sharp turn either to the right or to the left, a greater movement of the steering wheel will be required, in such case, before the index member 40 has moved beyond either of the colored areas 2 or 3 as the case may be, the end of the lever 41 having the finger piece 43 is depressed, thus disconnecting the operating mechanism for the indicator from the steering wheel and disposing the upstanding lugs 44 below the steering wheel arm. The indicator drum will be retained in its adjusted position, after pressure upon the lever 41 is released by the screw 37', while the movement of the steering wheel 36 is continued independently of said lever. After making the turn, the operator then returns the lever 41 to its former position, and again engages the lugs 44 thereon with one of the spokes or arms of the steering wheel, in which position the word "Go" is displayed by the indicator.

Therefore, after the movement of the steering wheel has been reversed to again proceed on a straight path, it is necessary to slightly depress the lever so that its fingers 44 may again be positioned at opposite sides of the steering wheel arm. Any one of the other legends carried by the plates 10 may similarly be displayed at any time by disconnecting the lever 41 from the steering wheel and independently actuating the operating means for the rotatable indicator member.

From the foregoing description considered in connection with the accompanying drawings, the construction, manner of operation and several advantages of my invention will be clearly and fully understood. It will be seen that I have devised a direction indicator for motor vehicles in which the several parts are of simple mechanical form, compactly arranged and readily applicable as an accessory to motor vehicles of the present standard constructions without necessitating any material alterations therein. The mechanical operating connections associated with the steering post and wheel are more or less inconspicuous and do not in any way interfere with the proper free movement of the steering wheel. The arrangement of the flexible connecting cables as is shown in Fig. 1 is of course, merely suggestive, and these cables may be so positioned and arranged relative to the motor vehicle body that they will be substantially wholly concealed. Also, as to the construction of the indicator housing, and the various other mechanical details of the device as herein disclosed, it will be apparent that the same may be embodied in various other alternative structures, and I accordingly, reserve the privilege of resorting to all such legitimate changes therein as may be fairly incorporated within the spirit and scope of the invention as claimed.

I claim:

1. In combination with a motor vehicle, indicating means carried by the vehicle and having a movable indicator member, and operating means for said indicator member including a manually operable part for actuating said operating means mounted for independent movement in a plane at right angles to the plane of the steering wheel and having means to releasably engage a part of said wheel whereby said operating means may be actuated simultaneously with the manipulation of the steering wheel.

2. In combination with a motor vehicle, indicating means carried by the vehicle and having a movable indicator member, and operating means for said indicator member including a member mounted beneath the steering wheel of the vehicle for rotation in respect thereto, operating connections between said member and the indicator member, an operating lever pivotally mounted upon said rotatable member to actuate the latter independently of the steering wheel, and means on said lever for releasably connecting the same with a part of the steering wheel whereby said wheel and the rotatable member may be actuated as a unit.

3. In combination with a motor vehicle, indicating means carried by the vehicle including a rotatably mounted indicator member, and operating means for said member including a shaft mounted upon the steering post in parallel relation thereto, operating connections between the lower end of said shaft and the rotatable indicator member, and means for rotating said shaft including a manually operable part movable relative to said shaft and having means for releasable engagement with a part of the steering wheel whereby said shaft may be rotated in the manipulation of the steering wheel or independently thereof.

4. In combination with a motor vehicle, indicating means carried by the vehicle including a rotatably mounted indicator member, and operating means for said member including a shaft mounted upon the steering post in parallel relation thereto, operating connections between the lower end of said shaft and the rotatable indicator member, a gear member loosely mounted upon the upper end of the steering shaft for rotation independently thereof and in constant mesh with a pinion on the upper end of said first named shaft, and an operating member connected with said gear having means releasably engageable with a part of the steering wheel whereby said gear is actuated simultaneously with the manipulations of said wheel, and said operating member being also manually operable independently of the steering wheel to actuate said gear.

5. In combination with a motor vehicle having a steering wheel shaft, an indicator carried by the vehicle, and operating means for said indicator including a gear element directly and loosely mounted on the upper end of the steering shaft, and an operating member for said gear element movably carried thereby and having means for releasable engagement with a part of the steering wheel whereby said gear element may be actuated by movement of the steering wheel, or independently of the latter.

6. In combination with a motor vehicle having a steering wheel shaft, an indicator carried by the vehicle, and operating means for said indicator including a gear element directly and loosely mounted on the upper end of the steering shaft, and an operating lever pivotally connected at one of its ends with said gear element to actuate the latter independently of the steering shaft, and said lever carrying means releasably engageable with a part of the steering wheel and through the medium of which, unitary rotation may be imparted to the steering shaft and said gear element.

In testimony that I claim the foregoing as my invention, I have signed my name hereto.

WALTER HUELLER.